No. 765,579. PATENTED JULY 19, 1904.
G. JAEGER.
APPARATUS FOR MAKING HOLLOW TILES.
APPLICATION FILED JAN. 19, 1904.
NO MODEL. 2 SHEETS—SHEET 1.

WITNESSES:
Walter Samariss
A. M. Steen

INVENTOR:
Gebhard Jaeger
by James K. Bakewell
his ATTORNEY.

No. 765,579. PATENTED JULY 19, 1904.
G. JAEGER.
APPARATUS FOR MAKING HOLLOW TILES.
APPLICATION FILED JAN. 19, 1904.
NO MODEL. 2 SHEETS—SHEET 2.
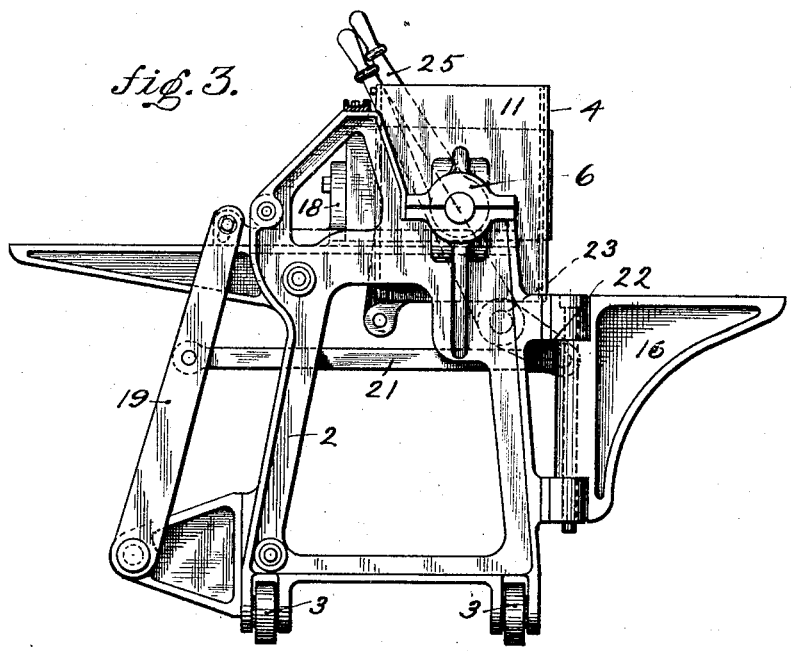
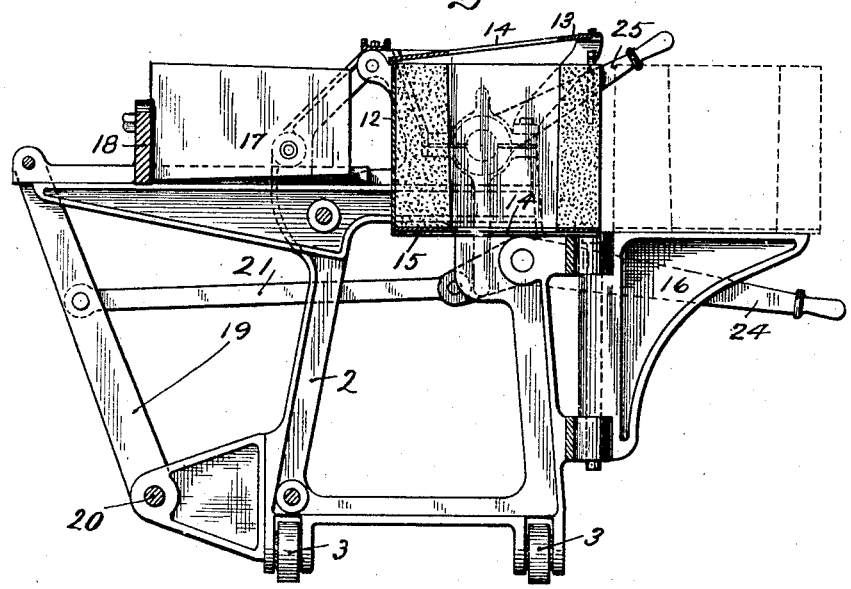
WITNESSES: INVENTOR:

No. 765,579. Patented July 19, 1904.

UNITED STATES PATENT OFFICE.

GEBHARD JAEGER, OF PITTSBURG, PENNSYLVANIA, ASSIGNOR TO THE HAYDEN AUTOMATIC BLOCK MACHINE COMPANY, OF COLUMBUS, OHIO, A CORPORATION OF OHIO.

APPARATUS FOR MAKING HOLLOW TILES.

SPECIFICATION forming part of Letters Patent No. 765,579, dated July 19, 1904.

Application filed January 19, 1904. Serial No. 189,766. (No model.)

*To all whom it may concern:*

Be it known that I, GEBHARD JAEGER, of Pittsburg, in the county of Allegheny and State of Pennsylvania, have invented a certain new and useful Improvement in Apparatus for Making Tiles, of which the following is a full, clear, and exact description, reference being had to the accompanying drawings, forming part of this specification, in which—

Figure 1:
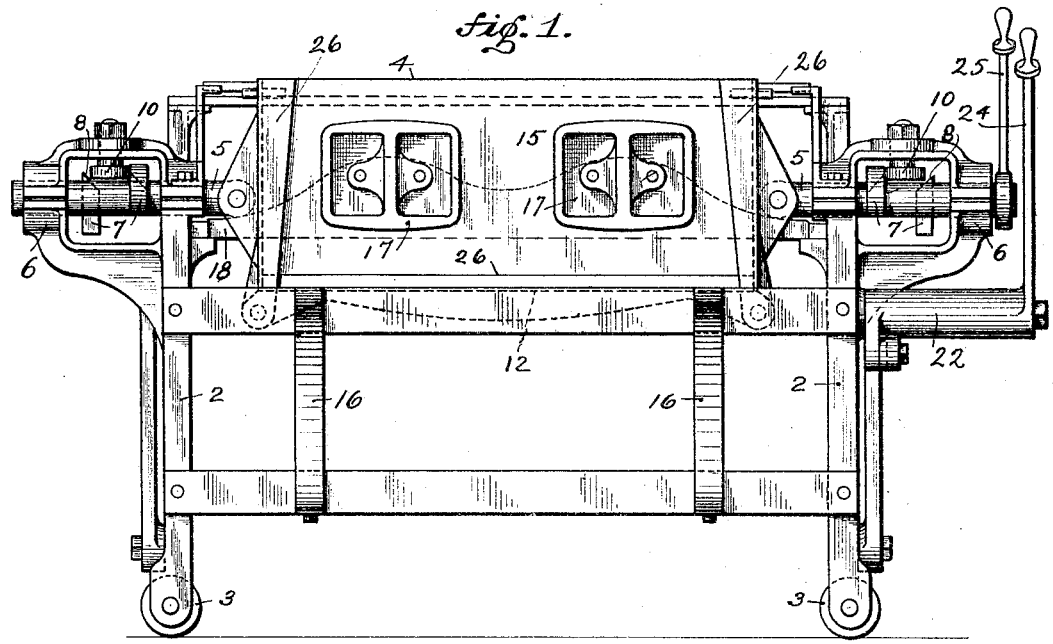
Figure 2:
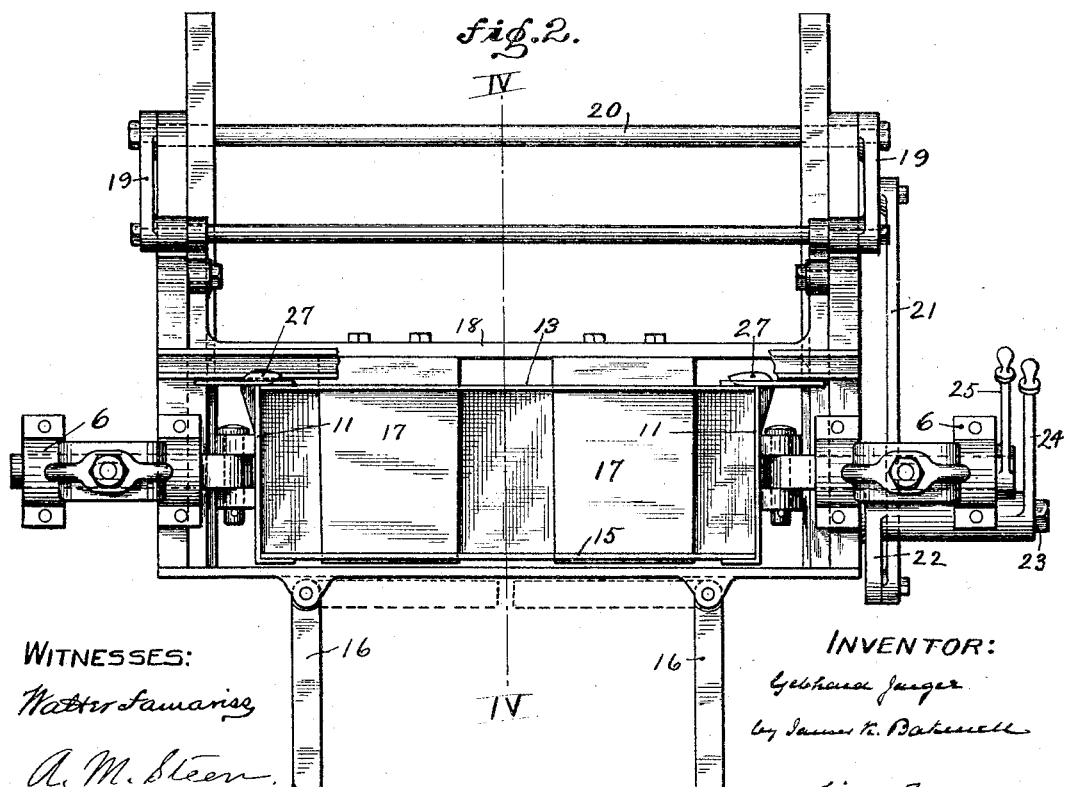

Figure 1 is a front elevation of the apparatus. Fig. 2 is a plan view of the same. Fig. 3 is an end elevation; and Fig. 4 is a vertical section on the line IV IV, Fig. 2, showing the mold in position for discharging the product.

My invention relates to an improvement in apparatus for making tiles which may be formed of concrete or any other suitable material; and it is especially adapted to forming what are known as "concrete" blocks, the body of which is formed of concrete, and the face may be formed of other or similar material having a finished surface which may represent marble, granite, or any other stone or material.

I will now describe my invention, so that others skilled in the art may manufacture and use the same.

In the drawings, 2 represents the frame of the apparatus, which may be mounted upon wheels 3 to enable the apparatus to be readily transported from one part of the building to the other, or a truck or other suitable means of transportation may be employed, as most convenient. Within the frame 2 is the mold 4, which may be formed of cast-iron or other suitable material, the interior of the mold being of the form which it is desired that the tile shall assume. This mold 4 is supported by means of trunnions 5, which extend from the ends of the mold through suitable bearings 6 in the frame 2. In the outer ends of these trunnions 5 outside of the bearings 6 are cams 7, having cam-faces 8. Above the cams 7 and adapted to engage with the faces thereof are friction-rollers 10, which friction-rollers are stationary, so that as the cam rotates on the shafts or trunnions 5 the cam-faces shall cause the trunnions to move in and out, and thereby cause the end leaves 11 of the mold 4 to open and close. These end leaves 11 are pivoted at their lower portions to the base of the mold, so that the leaves may open and close with the movement of the trunnions 5, the trunnions themselves being pivoted to shoulders on the outer faces of the leaves. The base-plate 12 of the mold 4 is designed to mold the imitation-stone face of the tile. To this base-plate 12 is hinged the side leaf 13, provided with openings 14 for the passage of the reciprocating plungers 17. Opposite the side leaf 13 is the removable side leaf 15, upon which the molded tile rests as it moves from the mold. In front of the mold 4 are hinged brackets 16, adapted to receive the molded tile. In the rear of the frame 2 are two plungers 17, supported on a reciprocating carrier 18, to the rear end of which carrier are pivoted levers 19, the ends of which levers are pivoted to the frame 2 by a pivotal shaft 20. Pivoted to the levers 19 are crank-arms 21, which at their other ends are pivoted to the cranks 22, mounted on the shaft 23 and operated by the hand-lever 24. By means of these arms and levers the carrier 18 may be caused to reciprocate and the plungers 17 enter and recede from the body of the mold 4 through the openings 14 in the side leaf 13 for the purpose of pressing the tile and forming the cavities therein. Secured to the outer end of one of the trunnions 5 is a hand-lever 25, by means of which the trunnions 5 and the cams 7, together with the mold 4, supported by the trunnions, may be given a one-quarter revolution.

The operation of this improved apparatus is as follows: The mold 4 being in its normal position, the open top of the mold being uppermost, the base-plate 12 being in a horizontal position, and the side leaves 13 and 15, both of which are provided with openings 14, being in a vertical position, the clay, concrete, cement, or other material which is to be used to form the outer face of the tile is first placed on the base-plate of the mold to a thickness of an inch or more, according to the material used and the block to be formed. The plungers 17 are then caused to reciprocate through the openings 14 in the side leaves 13 and 15 by means of the crank-arms and levers hereinbefore described, these levers being operated by the hand-lever 24. The passage of the plungers horizontally through the massed concrete compresses the material which forms the face portion of the tile, and the plungers are also adapted to form the hollow cavities within the tile when the mold is filled up with concrete or cement, which is done after the plungers have been moved into the mold. The plungers 17 are then withdrawn by a reverse movement of the hand-lever 24, leaving a molded tile within the mold.

In order to remove the tile from the mold, a quarter-revolution is imparted to the same by means of the hand-lever 25, which is keyed to the trunnions 5, and this quarter-revolution not only lowers the removable side leaf 15 to a horizontal position, but also by means of the cam 7 bearing against the friction-rollers 10 opens the pivoted end leaves 11, which separates these leaves from the end of the molded tile and allows the molded tile resting on the movable side leaf 15 to be removed from the mold by drawing the removable leaf forward to the hinged brackets 16, from which the removable leaf carrying the tile may be removed to the drying-room.

Although I have described both end leaves as being movable, and this is the preferable construction, I do not desire to limit myself thereto, as one of these leaves may be fixed.

I have also shown and described double plungers. It will be apparent that one of these plungers may be omitted where it is desirable to make a small tile.

I have also shown and described a mold of a certain shape adapted to make rectangular tile. By changing the shape and dimensions of the leaves of the mold and also of the plungers tiles of other shapes may be manufactured—as, for instance, an L-shaped tile, adapted to use for corner-pieces, may be manufactured by using a different shape in the base and the side pieces being modified accordingly.

The advantages of my invention will be appreciated by those skilled in the art. Owing to the fact that the face of the tile is formed on the base-plate of the mold, the movement of the plungers instead of marring or distorting this face serves to press the same firmly against the molding-face.

A further advantage is found in the fact that there is nothing to mar this face of the tile or any of the faces of the same when the tile is removed from the mold, for the reason that as the mold is thrown on its side position the tile is removed from the same and separates from the now vertical face of the mold without difficuty and without danger of distortion.

A further advantage is found in that the inner face of the tile is the unmolded face and is consequently left with a rough surface, which will more readily bind with the plastering of the building in which the tile is laid.

By means of my improved apparatus I am also enabled to manufacture hollow tile more rapidly and with fewer defects than has heretofore been possible.

By corrugating the inner faces of the side leaves 15 and 13 a corrugated surface may be imparted to the tile, and these corrugations, owing to the manner of the operation of the mold, will not in any wise interfere with the withdrawal of the tile from the same. These corrugations in the face of the tile serve to make a more binding joint between the tile as they are laid in the building.

Although I have described the side leaf 13 as being hinged to the base-plate 12, it is removably secured to the said base-plate, so that said side leaf 13 may be removed and one of different width substituted in its place, whereby tile of different thicknesses may be formed, the removable plate 15 being changed for one of equal size with the fixed plate 13. It will be noticed that the removable plate 15 is supported by means of flanges 26 on the base-plate 12 and the end leaves 11. These flanges should be of such width as to support the side leaf when the end leaves have been opened in the manner already described.

On the end leaves 11 are lugs or supporters 27, which engage with the side leaf 13 when the end leaves 11 are closed, making thereby a rigid mold which will not become distorted through the movement of the plungers 17.

Owing to the fact that the tiles are removed from the mold by a horizontal sliding movement, there is little danger of distortion of the tile through careless handling by the workmen, the tile coming out with a natural movement and resting on the brackets in front of the mold.

Having thus described my invention, what I claim, and desire to secure by Letters Patent, is—

1. In apparatus for the manufacture of tiles, a mold having a removable side leaf, movable end leaves, means for imparting rotatory movement to the mold, and devices for opening the end leaves as the mold rotates on its axis; substantially as specified.

2. In apparatus for the manufacture of tiles, the combination of a mold supported on trunnions, having a removable side leaf and movable end leaves, and cams adapted to open and close the movable leaves, when the mold is rotated on its axis; substantially as specified.

3. In apparatus for the manufacture of tiles, the combination of a mold having a removable side leaf, a movable end leaf, devices for automatically releasing the mold from the tiles, and a plunger adapted to reciprocate through the mold; substantially as specified.

4. In apparatus for the manufacture of tiles, the combination of a mold having a removable side leaf, movable end leaves, devices for rotating the mold, devices for automatically releasing the mold from the tiles, and a plunger adapted to reciprocate horizontally through the mold; substantially as specified.

5. In an apparatus for the manufacture of tiles, a sectional mold suspended for rotation, and means for automatically opening the mold to release the tile when the mold is rotated.

6. In an apparatus for the manufacture of tiles, a rotatable mold having a removable side leaf, a movable side leaf, and means connected with the mold for automatically releasing the mold from the tile when the mold is rotated.

7. In an apparatus for the manufacture of tiles, a rotatable mold having a removable side leaf, movable end leaves, a movable side leaf, and a rotatable and longitudinally-movable suspension means for the mold connected with said end leaves and adapted, when rotated, to simultaneously open the mold to release the tile.

8. In an apparatus for the manufacture of tiles, a mold suspended for rotation and having an open top, a side leaf having a plunger-opening and a removable side leaf, a plunger adapted to reciprocate through the said opening, and a suspension means for the mold adapted to automatically open the mold to release the tile when the mold is rotated.

9. In an apparatus for the manufacture of tiles, a suspended mold capable of receiving a quarter-revolution, said mold comprising hinged end pieces, and a rotatable suspension means connected with the end pieces and adapted, when operated, to move the end pieces, thereby opening the mold.

10. In an apparatus for the manufacture of tiles, a mold comprising a base-plate, a movable side leaf, a removable side leaf, and end pieces hinged to said base-plate, combined with a rotatable suspension means for the mold connected with said end pieces, said means, when operated, adapted to move the end pieces, thereby opening the mold to permit of the removal of the tile.

11. In an apparatus for the manufacture of tiles, a sectional mold suspended for rotation, and a rotatable and longitudinally-movable suspension means connected with the mold and adapted, when operated, to automatically release the mold to permit of the removal of the tile.

In testimony whereof I have hereunto set my hand.

GEBHARD JAEGER.

Witnesses:
A. M. STEEN,
WALTER FAMARISS.